United States Patent [19]

Nakamura et al.

[11] 4,217,525

[45] Aug. 12, 1980

[54] SPOT KILLER CIRCUIT

[75] Inventors: Kansei Nakamura, Fujisawa; Hikoichi Kusumoto, Chigasaki; Yoshinobu Yokono, Kamakura, all of Japan

[73] Assignee: Matsushita Electric Industrial Co., Ltd., Osaka, Japan

[21] Appl. No.: 33,261

[22] Filed: Apr. 25, 1979

[30] Foreign Application Priority Data

May 12, 1978 [JP] Japan .................................. 53-56919

[51] Int. Cl.² ............................................. H01J 29/52
[52] U.S. Cl. ...................................... 315/381; 358/220
[58] Field of Search .................. 315/381; 358/220, 245

[56] References Cited

U.S. PATENT DOCUMENTS

| 2,536,712 | 1/1951 | Bentley | 358/220 X |
| 2,774,007 | 12/1956 | Bigelow | 315/381 |
| 3,535,445 | 10/1970 | Griffery | 315/381 X |

Primary Examiner—Malcolm F. Hubler
Attorney, Agent, or Firm—Burgess, Ryan and Wayne

[57] ABSTRACT

A spot killer circuit wherein when a power switch is turned off, a transistor interconnected between the first gird of a picture tube and a low voltage supply is driven into the cut-off region so that the first grid voltage may be abruptly raised so as to cause the discharge of the picture tube.

5 Claims, 7 Drawing Figures

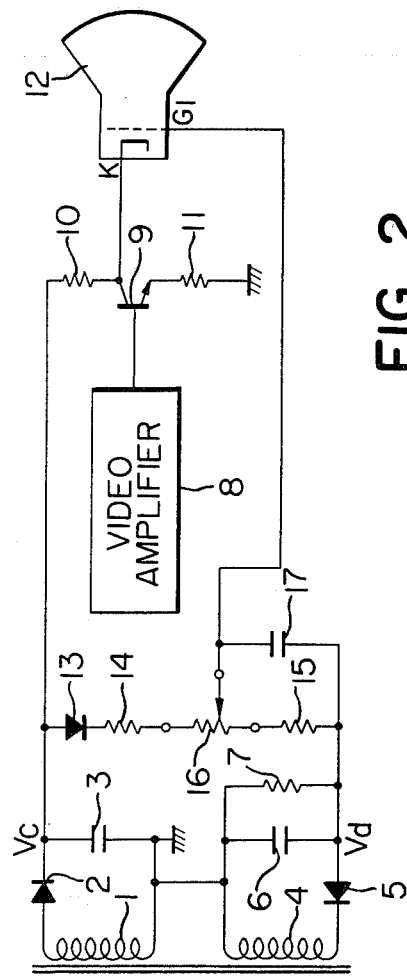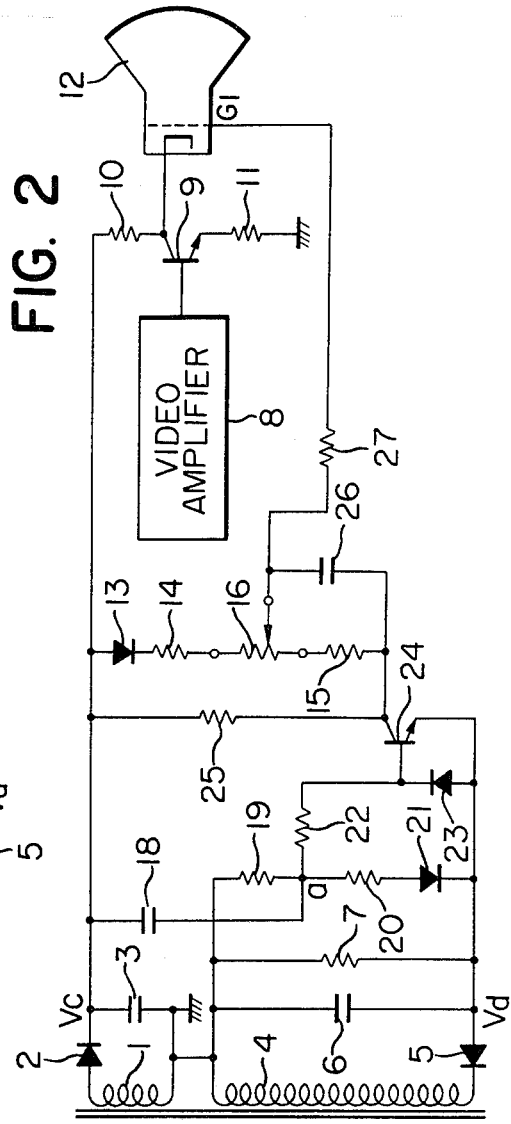

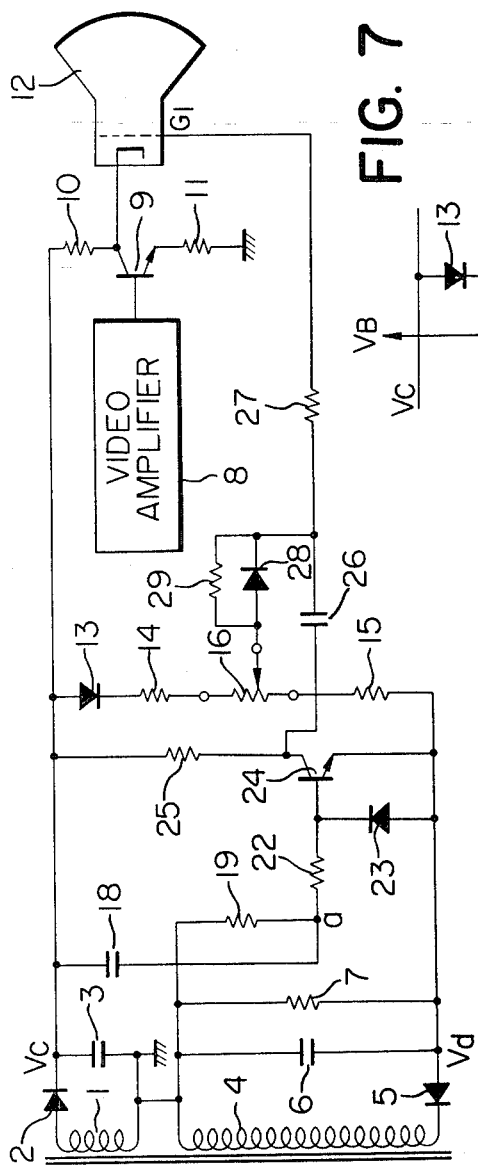
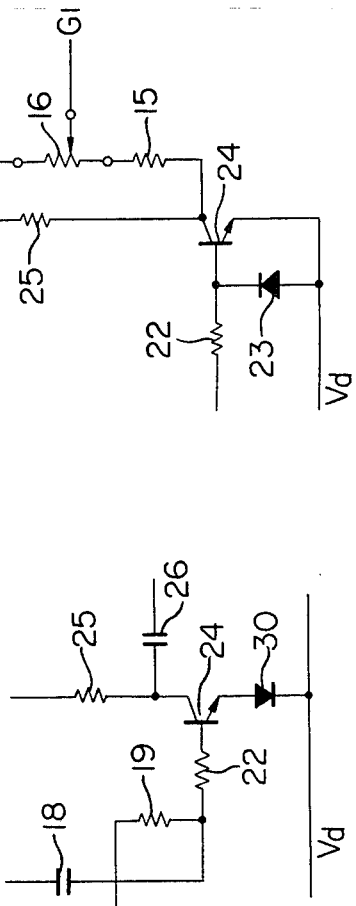
FIG. 3
FIG. 4
FIG. 7

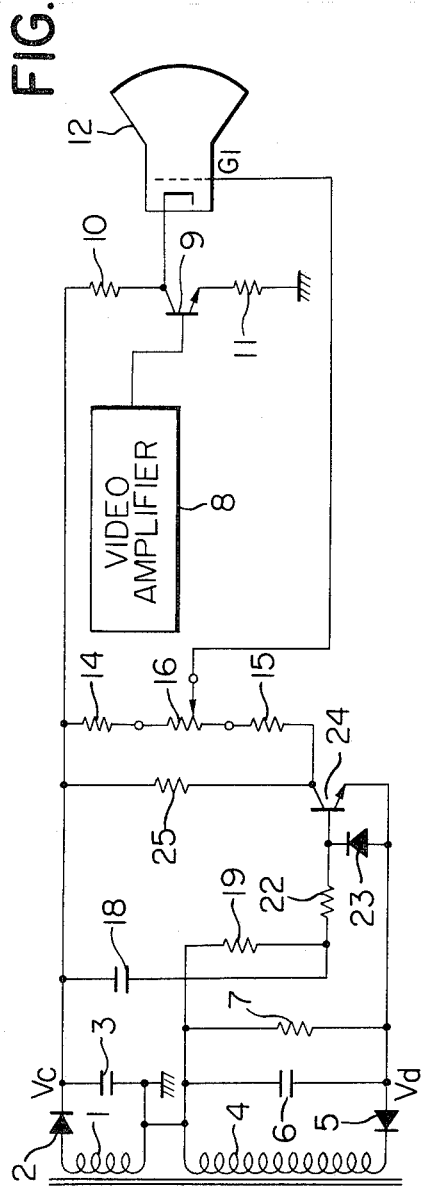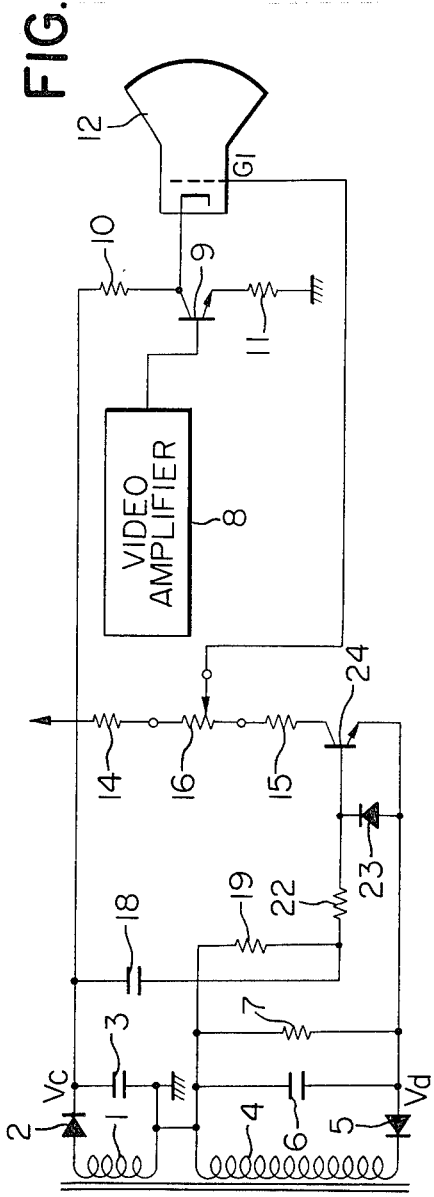

SPOT KILLER CIRCUIT

BACKGROUND OF THE INVENTION

The present invention relates to a spot killer circuit for the television receiver which may completely prevent a picture tube from being burned after a power switch is turned off.

In various equipment incorporating picture tubes such as television receivers, display monitors and so on, when the charge still remains on the picture tube after the power switch is turned off, the beam current flows due to the residual heat of the heater of the picture tube even after the deflection system stops its operations so that spots are produced on the screen of the picture tube. When the beam current is high, the intensified spot impinges on the phosphor screen, thus causing a spot damage to it. In order to overcome this problem, there has been devised and demonstrated a spot killer circuit of the type in which the bias voltage of the picture tube is brought to zero at the instant when the power switch is turned off, thereby causing the discharge of the picture tube. However when the extremely high voltage system has a high capacitance, the discharge of the picture tube will not be completed before the operations of the deflection system stop so that a spot is still produced.

SUMMARY OF THE INVENTION

Accordingly, one of the objects of the present invention is to provide a spot killer circuit capable of raising the first grid voltage of the picture tube for a time interval required for completing the discharge of the picture tube, thereby eliminating a spot.

BRIEF DESCRIPTION OF THE DRAWINGS

FIG. 1 is a diagram of a prior art spot killer circuit;

FIGS. 2, 3, 4 and 5 are circuit diagrams of first, second, third and fourth embodiments, respectively, of the present invention; and FIGS. 6 and 7 are circuit diagrams of two modifications, respectively, of the fourth embodiments shown in FIG. 5.

Same reference numerals are used to designate similar parts throughout the figures.

DESCRIPTION OF THE PREFERRED EMBODIMENTS

Prior Art, FIG. 1

In FIG. 1 is shown a diagram of a prior art spot killer circuit for a television receiver. Reference numeral 1 denotes a cathode-bias winding of a flyback transformer for inducing DC voltage from +50 to +150 V; 2, a rectifying diode; 3, a smoothing capacitor; 4, a grid-bias winding of the flyback transformer for inducing DC voltage of from −50 to −200 V; 5, a rectifying diode; 6, a smoothing capacitor; 7, a discharge resistor; 8, a video amplifier; 9, a video output transistor; 10, a collector resistor of the video output transistor 9; 11, an emitter resistor of the video output transistor 9; 12, a picture tube; 13, a diode; 14 and 15, resistors constituting a voltage divider for obtaining a brightness control voltage; 16, a variable resistor for brightness control; 17, a spot killer capacitor; Vc, a video output+power supply; and Vd, a negative power supply for the grid.

When a power switch of the television receiver is turned off, the voltage Vd at one end of the capacitor 17 rises toward the ground or earth potential with a time constant which is dependent upon the values of the capacitor 6 and the resistor 7 so that the potential of the first grid $G_1$ of the picture tube 12 also rises. As a result, the bias voltage applied to the picture tube 12 drops below a normal level so that the charge on the picture tube 12 is discharged.

The potential Vd varies depending upon the time constant of the capacitor 6 and the resistor 7 so that the first grid voltage $G_1$ of the picture tube 12 also gradually changes and consequently the discharge is less. Therefore when the capacitance of the extremely high voltage system is high, the charge on the picture tube 12 cannot be completely discharged until the time when the deflection system stops its operation. As a result, spots appear. This phenomenon is pronounced especially when the variable resistor 16 for the brightness control is set to a lower value.

First Embodiment, FIG. 2

In FIG. 2 is shown a diagram of a first embodiment of a spot killer circuit in accordance with the present invention. A series circuit consisting of a capacitor 18 and a resistor 22 is interconnected between the output terminal of the rectifying diode 2 and the base of a transistor 24. A resistor 19 is interconnected between one end of the winding or coil 4 and the junction between the capacitor 18 and the resistor 22. A diode 23 is interconnected between the base of the transistor 24 and the anode of the rectifying diode 5. A series circuit of a resistor 20 and a diode 21 is interconnected between the junction between the capacitor 18 and the resistor 22 and the anode of the rectifying diode 5. A resistor 25 is interconnected between the collector of the transistor 24 and the rectifying diode 2. A series connected circuit of a spot killer capacitor 26 and a protective resistor 27 for protecting the transistor 24 during the discharge of the picture tube 12 is interconnected between the collector of the transistor 24 and the first grid $G_1$ of the picture tube 12.

The voltage at the junction a between the resistor 19 and the resistor 20 is so selected as to be higher than the sum of $V_{BE}$ (about 0.7 V) of the transistor 24 and the ripples of Vc and Vd, Vd being a reference voltage. This arrangement ensures that the transistor 24 will not be turned off due to the ripple variations. The resistor 22 is interconnected between the junction a and the base of the transistor 24 which are different in potential level. However when the ripple or parted quantity is less, the resistor 22 may be eliminated. The values of the resistors 19, 20 and 22 are so selected that the transistor 24 may be normally driven into and maintained in the saturation state. As a result the voltage drop between the collector and emitter of the transistor 24 is less so that the collector voltage of the transistor 24; that is, the voltage at the lower potential point of the brightness control circuit may be taken to be equal to Vd.

When the power supply switch of the television receiver is turned off, the time constant of the time-constant circuit of the capacitor 18 and the resistor 19 is selected to be higher or longer than that of the time-constant circuit of the capacitor 6 and the resistor 7. Then the variations in Vc are transmitted through the capacitor 18 to the base of the transistor 24 so that the base potential drops while the emitter voltage rises (toward the grounding potential) in response to the variations in Vd. Because of the cumulative effect of the drop of the base voltage and the rise of the emitter voltage, the transistor 24 may be very quickly turned and then cut off.

The diode 21 is inserted so as to disconnect the resistor 20 from the Vd line when the power switch is turned off, thereby reducing the number of the discharge path of the capacitor 18 and consequently increasing the discharge resistance. The diode 23 is inserted so as to protect the emitter of the transistor 24 against an excess voltage and to reduce the impedance between the base and emitter of the transistor 24.

The variations in the Vc line are transmitted directly to the junction a through the capacitor 18. When the sum of the variations in the Vc and Vd lines exceeds quantatively the potential difference between the junction a and the base of the transistor 24 in the case of normal operation, the transistor 24 is driven into the cut-off region so that the collector voltage becomes Vc and the voltage at the first grid $G_1$ of the picture tube 12 rises by a voltage equal to the voltage across the capacitor 26. Thus in the picture tube 12 the relationship $V_{G1} > V_K$, where $V_{G1}$ is the grid voltage and $V_K$ is a cathode voltage, is positively maintained so that the voltage $V_{G1K}$ of the first grid $G_1$ measured on the basis of the cathode voltage $V_K$ is held about 0 ($I_{G1K} \simeq 0$) while the picture tube itself is biased with a maximum current. As a result the charge may be discharged, at a high rate within a short time interval when the deflection system is still operating.

The elimination of the diode 13 will not adversely affect the fundamental operations of the spot killer circuit. The diode 13 is inserted in order to disconnect the resistor 14 from the Vc line when the power supply switch is turned off, thereby facilitating the rise of $V_{G1}$. One end of the capacitor 18 may be connected to any suitable point instead of being connected to the Vc line. In general, the higher the potential at the point to which is connected one end of the capacitor 18, the greater the variations in terms of an absolute value becomes. Therefore it is preferable to connect one end of the capacitor 18 to a high potential point. Furthermore one end of the capacitor 18 may be connected to a point where the potential drop occurs in response to the turning off of the on-off switch. The operations of the spot killer circuit remain unchanged. For instance, one end of the capacitor 18 may be connected to a focusing power supply.

One end of the resistor 19 which is shown as being directly connected to one end of the winding 4 may be connected to any suitable point. For instance, one of the resistor 19 may be connected to the Vc line. In general, a connecting point of the resistor 19 is provided in the point of higher potential in the Vd line so that a larger time constant may be obtained. One end of the resistor 25 which is shown as being connected to the Vc line may be connected to a higher potential point and may be grounded when the voltage across the capacitor 26 is high.

Second Embodiment, FIG. 3

A second embodiment of the present invention shown in FIG. 3 is different from the first embodiment described above with reference to FIG. 2 in (a) that the resistor 20 and the diode 21 are eliminated; (b) that the collector of the transistor 24 is connected only to the capacitor 26 and (c) that a parallel circuit of a diode 28 and a resistor 29 is interconnected between the variable resistor 16 for brightness control and the first grid $G_1$ of the picture tube 12. The base-emitter drop of the transistor 24 is about 0.7 V, and the voltage at the junction a which is dependent on of the values of the voltage dividing resistors 19 and 22 is made equal to that at the junction a in the first embodiment.

When ripple is less, the resistor 22 may be eliminated. The output from the transistor 24 increases only the voltage of the terminal of the capacitor 26 and the voltage across the capacitor 26 is remained, thereby raising the potential of the first grid $G_1$ of the picture tube 12. The diode 28 is inserted in order to disconnect the brightness control circuit from the discharge path of the capacitor 26, thereby increasing the time constant. However when the combination of the resistors 14, 15 and 16 and the capacitor 26 may provide a desired time constant, the diode 28 may be eliminated. The resistor 29 is a leaking resistor. In this case the diode 13 has almost no effect.

The second embodiment described above is advantageous in that the case circuit is simplified and that even when the transistor 24 is opened during the normal operation, the rise of $V_{G1}$ of the picture tube 12 may be prevented.

Third Embodiment, FIG. 4

A third embodiment shown in FIG. 4 is substantially similar in construction to the first and second embodiments described above except that a diode 30 is inserted between the emitter of the transistor 24 and the Vd line in order to protect the emitter from being applied with an excessive voltage. The third embodiment is advantageous in that the impedance of the base circuit may be increased.

Fourth Embodiment, FIG. 5

A fourth embodiment shown in FIG. 5 is substantially similar in construction to the first embodiment described with reference to FIG. 2 except that the diode 13, the capacitor 26 and the resistor 27 are eliminated so that the collector of the transistor 24 is connected to the first grid $G_1$ of the picture tube 12 only through the conductive path. The collector resistor 25 of the transistor 24 is connected to Vc or a higher potential point so that the voltage $V_{G1K}$ between the grid and cathode of the picture tube 12 may be positively and always maintained higher than zero; that is, $V_{G1K} > 0$ when the power switch is turned off. The collector resistor 25 may be eliminated when the brightness control variable resistor 16 may have a sufficient power rating so as to serve as a collector resistor for the transistor 24 as shown in FIG. 6. In the modification shown in FIG. 6, one end of the resistor 14 is connected to a power supply $V_B$ which is higher than Vc. $V_B$ is for instance a power supply for focusing.

In a modification shown in FIG. 7, the resistor 25 is connected to the power supply $V_B$ and the anode of the diode 13 is connected to Vc. In the modification shown in FIG. 6, the ripple current flows into the brightness control circuit, but in the case of the modification shown in FIG. 7, when the transistor 24 is driven into the saturation, the collector-emitter voltage $V_{CE}$ of the transistor 24 is less and constant so that the ripple components will not adversely affect the operation of the spot killer circuit. When the transistor 24 is not driven into the saturation, the collector voltage Vcol must be set to a predetermined point.

In the embodiments and modifications described above, only one transistor 24 is used, but it will be understood that it may be replaced with any other suitable amplifying element or amplification circuit. The power supplies are obtained by the rectification of the outputs from the flyback transformer, but when the voltage of the B line of the system is relatively high and for instance a voltage between 70 and 140 V may be obtained by directly rectifying a commercial power supply, it may be used as Vc. The voltage $V_B$ shown in FIG. 6 or 7 may use a voltage in a point nearer to the rectifier in the power circuit supplying a voltage to the B line of the system. The configuration of an amplification circuit, which corresponds to the transistor 24, becomes most simple when it is so designed as to make on-off operations, but it is to be emphasized that even when it is so designed as to make amplification operations, the effects and advantages of the present invention may be equally attained.

What is claimed is:

1. A spot killer circuit wherein a transistor is interconnected in series between the first grid of a picture tube and a low voltage supply for supplying a voltage to said first grid; the input point of said transistor is connected to a high voltage supply through a time-constant circuit which may cut off said transistor for a time interval required for discharging the charge on the anode of said picture tube when a power switch is opened, the high voltage supply supplying a higher voltage than said low voltage supply; and the output point of said transistor is connected to said high voltage supply, whereby when the power switch is opened, said transistor is cut off and consequently the potential of the first grid of said picture tube rises.

2. A spot killer circuit as set forth in claim 1 wherein said transistor is interconnected between the first grid of said picture tube and said low voltage supply, a first time-constant circuit is connected between said low voltage supply and the ground; said input point of said transistor is connected to said high voltage supply through a second time-constant circuit; and a time constant of said first time-constant circuit is made shorter than a time-constant of said second time-constant circuit.

3. A spot killer circuit as set forth in claim 1 wherein the reference point of said transistor is connected to said low voltage supply which supplies a voltage to the first grid of said picture tube; the input point of said transistor is connected through a capacitor to said high voltage supply; the output point of said transistor is connected to a low voltage side of a circuit for controlling the first grid voltage of said picture tube; and the output of said transistor is connected to the first grid of said picture tube through a capacitor, whereby in the normal operation the voltage at the output point of said transistor may be equal to the voltage at the reference point thereof but when the power switch is opened, said transistor may be cut-off in response to the variation in the voltage at the input point of said transistor or to the variation in the voltage at the reference point thereof or to the variations in both the voltages between the output and reference points and consequently the voltage at the output point may be abruptly increased.

4. A spot killer circuit as set forth in claim 1 wherein the reference point of said transistor is connected to said low voltage supply which supplies a voltage to said first grid of said picture tube; the input of said transistor is connected through a capacitor to said high voltage supply; the output point of said transistor is connected only through a capacitor to the first grid of said picture tube; and the low voltage side of a circuit for controlling the voltage at the first grid of said picture tube is connected to said low voltage supply.

5. A spot killer circuit as set forth in claim 1 wherein the reference point of said transistor is connected to said low voltage supply which supplies a voltage to the first grid of said picture tube; the input point of said transistor is connected through a capacitor to said high voltage supply; and the output point of said transistor is connected to the first grid of said picture tube only through a conductive path, whereby when the power switch is turned off, the voltage at the first grid of said picture tube may be raised to a voltage substantially equal to or higher than the cathode voltage of said picture tube.

* * * * *